United States Patent [19]

Huggins, Sr.

[11] Patent Number: 4,841,636
[45] Date of Patent: Jun. 27, 1989

[54] POSITIVE DRIVE MECHANISM FOR UNIFORM FEED OF INTERNAL TUBE CUTTER

[75] Inventor: Thomas B. Huggins, Sr., Columbia, S.C.

[73] Assignee: Westinghouse Electric Corp., Pittsburgh, Pa.

[21] Appl. No.: 91,563

[22] Filed: Aug. 31, 1987

[51] Int. Cl.[4] ............... B23D 21/03; B23D 21/14
[52] U.S. Cl. ......................... 30/107; 82/1.2; 82/82
[58] Field of Search ............... 30/103, 104, 105, 106, 30/107, 108; 72/122, 123; 82/1.2, 82; 408/150, 159, 162

[56] References Cited

U.S. PATENT DOCUMENTS

| | | | |
|---|---|---|---|
| 512,631 | 1/1894 | Thieme | 30/107 |
| 531,662 | 1/1895 | Thieme | 30/107 |
| 558,422 | 4/1896 | Richard | 30/107 |
| 647,104 | 4/1900 | Miller | 30/107 |
| 819,516 | 5/1906 | Chamberlain | 30/107 |
| 906,797 | 12/1908 | Hawkins | 30/107 X |
| 949,136 | 2/1916 | Ashley | 30/107 |
| 1,095,229 | 5/1914 | Renner | 30/107 |
| 1,162,893 | 12/1915 | Wiedeke | 30/107 |
| 1,478,692 | 12/1923 | Baranoff | 30/107 |
| 1,756,717 | 4/1930 | Wiedeke | 30/107 |
| 1,789,572 | 1/1931 | Wiedeke | 30/107 |
| 1,883,453 | 10/1932 | Armstrong | 30/107 |
| 2,276,727 | 3/1942 | Johnson | 30/107 X |
| 2,295,789 | 9/1942 | Hoorn et al. | 30/107 |
| 2,446,734 | 8/1948 | Armstrong | 30/108 |
| 2,508,539 | 5/1950 | Reck | 30/107 |
| 2,700,818 | 2/1955 | Fisher | 30/107 |
| 3,396,795 | 8/1968 | Venghiattis | 166/55.7 |
| 3,583,822 | 6/1971 | Alexander et al. | 408/11 |
| 4,455,746 | 6/1984 | Idzik et al. | 30/106 |
| 4,589,309 | 5/1986 | Nokovich | 30/107 X |
| 4,621,549 | 11/1986 | Nokovich | 30/107 X |
| 4,712,302 | 12/1987 | Diller | 30/107 |

Primary Examiner—Frank T. Yost
Assistant Examiner—Michael D. Folkerts

[57] ABSTRACT

A positive drive mechanism is provided to operate an internal tube cutter. The tube cutter has a body insertable into a tube to be severed, and a wedge-shaped slide supporting a cutting wheel on a forward portion of the cutter body. The slide and cutting wheel are movable toward and away from the tube. An elongated member is mounted through the cutter body for movement longitudinally thereof in one direction to cause outward radial movement of the slide and advancement of the cutting wheel toward and into contact with the tube to cause severing of the same upon rotation of the cutter body and in an opposite direction to permit inward radial movement of the slide and retraction of the cutting wheel away from and out of contact with the tube. The positive drive mechanism includes a housing rotatably mounting the cutter body, a cutter body drive portion mounted to the housing and drivingly interconnected to the cutter body for rotating or counterrotating the same, and a cutter wheel feed portion engaged with the elongated member of the cutter at a rear portion of the cutter body and operable to intermittently move the elongated member in the one direction toward the slide or permit intermittent movement of the elongated member in the opposite direction away from the slide during each rotation cycle of the cutter body.

15 Claims, 3 Drawing Sheets

POSITIVE DRIVE MECHANISM FOR UNIFORM FEED OF INTERNAL TUBE CUTTER

BACKGROUND OF THE INVENTION

1. Field of the Invention

The present invention relates generally to severing tubes, such as guide thimbles from a fuel assembly top nozzle and, more particularly, is concerned with a positive drive mechanism for uniform feed of an internal tube cutter in order to circumferentially cut the guide thimble from the inside out without generating chips.

2. Description of the Prior Art,

In most nuclear reactors, the reactor core is comprised of a large number of elongated fuel assemblies. Conventional designs of these fuel assemblies include a multiplicity of fuel rods held in an organized array by grids spaced along the fuel assembly length. The grids are attached to a plurality of hollow tubular guide thimbles. Top and bottom nozzles on opposite ends of the fuel assembly are secured to the guide thimbles which extend above and below the opposite ends of the fuel rods. Typically, at the top end of the fuel assembly, the guide thimbles are attached in passageways provided in the adapter plate of the top nozzle.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. In order to remove and replace these defective fuel rods in reconstitution of the fuel assembly, the top nozzle of the fuel assembly must first be removed. One approach to removal of the top nozzle is to sever each guide thimble from the top nozzle adapter plate by circumferentially cutting the guide thimble from the inside out just below its region of attachment to the adapter plate. Precision internal tube cutters devised for this purpose are illustrated and described in U.S. Pat. Nos. 4,589,309 and 4,621,549 to Nokovich, which patents are assigned to the assignee of the present invention.

The guide thimbles are typically composed of stainless steel. Thus, a controlled positive rate of feed of the cutting wheel (or wheels) of the precision internal cutter is believed essential to ensure satisfactory cutting of the stainless steel without producing chips and to prolong the life of the carbide cutting wheels. A variety of mechanisms have been developed over the years for feeding internal tube cutters and other tools. Representative of such prior art mechanisms are the ones disclosed in U.S. Pat. Nos. to Thieme (512,631 and 531,662), Richard (558,422), Miller (647,104), Chamberlain et al (819,516), Ashley (949,136), Renner (1,095,229), Wiedeke (1,162,893), Baranoff (1,478,692), Wiedeke (1,756,717 and 1,789,572), Armstrong (1,883,453), Hoorn et al (2,295,789), Armstrong (2,446,734), Reck (2,508,539), Fisher (2,700,818), Venghiattis (3,396,795), Alexander et al (3,583,822) and Idzik et al (4,455,746).

However, none of these prior art mechanisms seem to be particularly well-suited for driving a cutter at a controlled positive rate of feed to sever guide thimbles from the top nozzle of an irradiated fuel assembly in a manner which does not produce chips and debris. Consequently, a need exists for development of such an internal tube cutter drive mechanism.

SUMMARY OF THE INVENTION

The present invention provides features in a positive drive mechanism which are designed to satisfy the aforementioned needs. The drive mechanism of the present invention operates automatically to ensure a uniform positive feed of the cutting wheel into the guide thimble. This automatic positive feed feature minimizes work hardening of the stainless steel material of the guide thimble which prolongs the useful life of the carbide cutter by controlling the advance of the cutting wheel into the guide thimble at a rate that is proportional to the rotational speed of the cutter. It also has a manually operated rapid advance/retract feature which can override the automatic feed feature of the drive mechanism.

Accordingly, the present invention is directed to a positive drive mechanism set forth in combination with an internal tube cutter. The tube cutter includes an elongated body insertable into a tube to be severed, a cutting wheel, means supporting the cutting wheel on a forward portion of the body and being movable radially of the body for advancing and retracting the cutting wheel toward and away from the tube, and an elongated member mounted through the body for movement longitudinally thereof in one direction to cause outward radial movement of the cutting wheel supporting means and advancement of the cutting wheel toward and into contact with the tube to cause severing of the same upon rotation of the body and in an opposite direction to permit inward radial movement of the cutting wheel supporting means and retraction of the cutting wheel away from and out of contact with the tube.

The positive drive mechanism comprises: (a) a housing rotatably mounting the cutter body; (b) a cutter body drive portion mounted to the housing and drivingly interconnected to the cutter body, the drive portion being operable for rotating or counterrotating the cutter body; and (c) a cutter wheel feed portion engaged with the elongated member of the cutter at a rear portion of the cutter body and operable to intermittently move the elongated member in the one direction toward the cutting wheel supporting member or permit movement of the elongated member in the opposite direction away from the cutting wheel supporting member during each rotation cycle of the cutter body as the latter is respectively rotated or counterrotated by the cutter body drive portion.

More particularly, the cutter body drive portion includes power means mounted to the housing and having a rotatable output drive shaft. The drive portion also includes a driven member drivingly coupled to the cutter body, and a drive member, drivingly coupled to the output shaft of the power means and drivingly interconnected to the driven member for transmitting the rotary motion of the output shaft to the cutter body. Further, an endless flexible member extends between and drivingly interconnects the drive and driven members for transmitting the rotary motion of the output shaft to the cutter body.

Still further, the cutter wheel feed portion includes a feed member rotatably threadably mounted in a rear portion of the cutter body, and a ratchet attached to the feed member for rotatable movement therewith. The feed member is engaged with the elongated member of the cutter. The feed member is adapted to be maintained stationary or allowed to rotate with the cutter body. While being maintained stationary, the feed member threads into the cutter body and causes movement of the elongated member in the one direction toward the cutting wheel supporting member as the cutter body is rotated in one direction. On the other hand, the feed member unthreads from the cutter body and permits movement of the elongated member in the opposite direction away from the cutting wheel supporting member as the cutter body is counterrotated in an opposite direction while the feed member is held stationary.

The cutter wheel feed portion of the positive drive mechanism further includes a pawl, biasing means, a cam and a cam follower. The pawl is pivotally mounted to the housing adjacent the ratchet for movement into and out of engagement therewith such that when the pawl is engaged with the ratchet it maintains the ratchet and feed member therewith stationary relative to the cutter body whereby the feed member threads into the cutter body upon rotation thereof. However, when the pawl is disengaged from the ratchet, the latter and the feed member therewith are permitted to rotate with the cutter body. The biasing means normally urges the pawl into engagement with the ratchet.

The cam is attached to the rear portion of the cutter body for rotation therewith and has a periphery with first and second portions thereon. The cam follower is mounted to the pawl and rides in engagement with the periphery of the cam such that as the cam rotates with the cutter body and the cam follower rides on the first peripheral cam portion the pawl is displaced toward the ratchet allowing the biasing means to urge the pawl into engagement with the ratchet, whereas as the cam follower rides on the second peripheral cam portion the pawl is displaced away from and disengaged from the ratchet.

The positive drive mechanism also includes an extension in the form of a knob on the feed member which can be used for holding the feed member stationary as the cutter body is rotated to move the feed member into the cutter body. The knob also manually rotated for continuously threading or unthreading the feed member into or from the cutter body while the latter is stationary. Also, an arm projects from the housing of the mechanism and is adjustable for setting the depth to which the forward portion of the cutter body extends into the tube to be severed.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
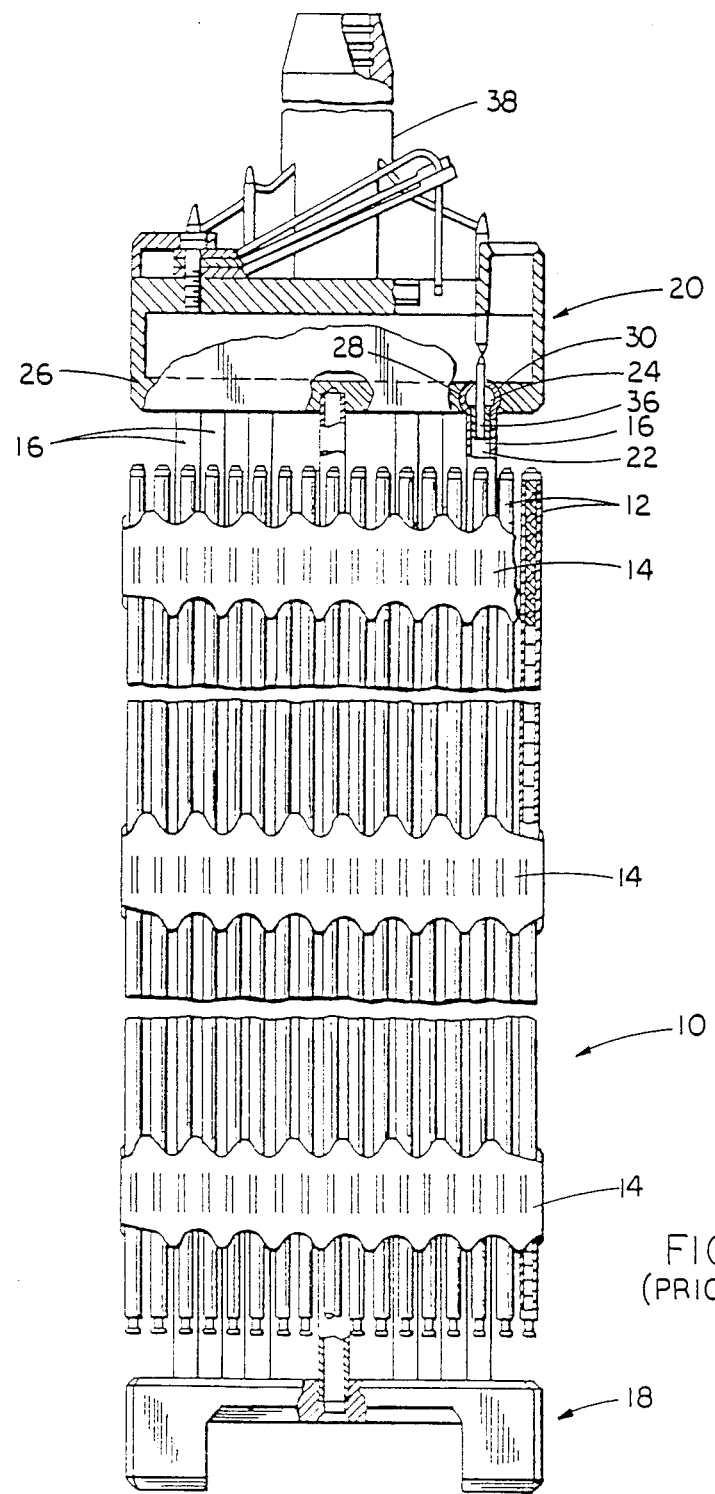
FIG. 1 is an elevational view, partly sectioned and with parts broken away for clarity, of a prior art fuel assembly which is reconstitutable using an internal tube cutter supported and powered by a positive drive mechanism constructed in accordance with the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown a fuel assembly, generally designated by the numeral 10. The fuel assembly 10, being of conventional construction, includes an array of fuel rods 12 held in parallel, closely spaced relation to one another by grids 14 (only three of which are shown) spaced along the fuel assembly length. Each fuel rod 12 includes nuclear fuel pellets (not shown) and is sealed at its opposite ends. The fuel pellets composed of fissible material are responsible for creating the reactive power of the nuclear reactor core in which the fuel assembly is placed. A typical liquid moderator/coolant such as water, or water containing boron, is pumped upwardly through the fuel assemblies of the core in order to extract heat generated therein for the production of useful work.

The fuel assembly 10 also includes a number of longitudinally extending guide tubes or thimbles 16 along which the grids 14 are spaced and to which they are attached. The opposite ends of the guide thimbles 16 extend a short distance past the opposite ends of the fuel rods 12 and are attached respectively to bottom and top nozzles 18, 20 of the fuel assembly. The upper end portions 22 of the guide thimbles 16, being inserted into respective passageways 24 in an adapter plate 26 of the top nozzle 20, are attached therein, for example, by a circumferential bulge 28 which fits into an internal groove 30 in the passageway, as seen in FIG. 1, or by a circumferential weld 32 formed between the adapter plate 26 and the upper edge 34 of the guide thimble 16, as seen in FIG. 2.

To control the fission process, a number of control rods 36 are reciprocally movable in the guide thimbles 16 located at predetermined positions in the fuel assembly 10. Specifically, a rod cluster control mechanism 38 located above the top nozzle 20 and interconnected to the control rods 36 is operable to move the control rods vertically in the guide thimbles 16 to thereby control the fission process in the fuel assembly 10, all in a well-known manner.

Positive Drive Mechanism for Feeding Tube Cutter

Figures 2, 3, 4:
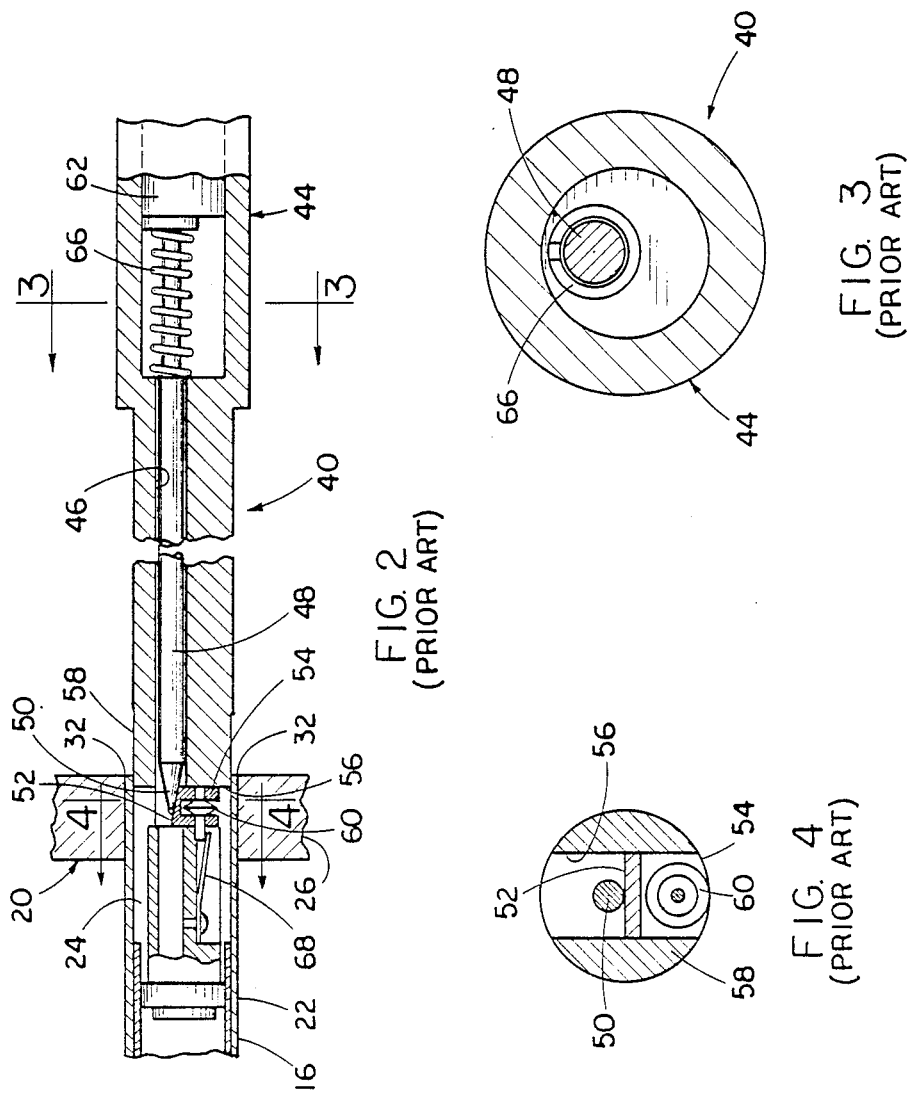
FIG. 2 is a side elevational view, partly sectioned, of the prior art precision internal tube cutter, showing the tube cutter in foreshortened form and disposed within the upper end portion of a guide thimble inserted and within a passageway of a top nozzle adapter with the guide thimble and adapter plate illustrated in fragmentary, sectioned form.
FIG. 3 is an enlarged cross-sectional view of the tube cutter taken along line 3—3 of FIG. 2.
FIG. 4 is an enlarged cross-sectional view of the tube cutter taken along line 4—4 of FIG. 2.

To remove the top nozzle 20 for reconstituting the fuel assembly 10, a suitable cutting means, such as a prior art precision tube cutter 40 shown in FIGS. 2-4 and disclosed in detail in the aforementioned patents, is inserted into the upper end portion 22 of the hollow guide thimble 16 after removal of the control rod 36 therefrom. The tube cutter 40 is supported and operated by a positive drive mechanism 42 of the present invention, shown in FIGS. 5 and 6.

Referring to FIGS. 2-4, the precision tube cutter 40 basically includes a generally cylindrical elongated cutter body 44 having an axially offset bore 46 with a longitudinally movable pin 48 disposed therein. The pin 48 has a lower conical tip 50 which engages an inclined surface 52 on the inner end of a transversely movable wedge-shaped slide 54 mounted within a transverse slot 56 in a forward portion 58 of the cutter body 44. The movable slide 54 rotatably supports a circular cutting wheel 60 at its outer end. The upper end of the pin 48 is adapted for engagement with the lower end of a feed screw 62 of the positive drive mechanism 42 threaded into rear portion 64 of the cutter body 44, as seen in FIG. 5.

Upon threading of the feed screw 62 further into the cutter body 44, the pin 48 is moved downwardly so that the slide 54 and its cutting wheel 60 are advanced radially outward toward the upper end portion 22 of the guide thimble 16. Upon unthreading of the feed screw 62 from the cutter body 44, the pin 48 moves upwardly, being urged away from the slide 54 by a return spring 66 coiled about the pin 48. Upon withdrawal of the lower conical tip 50 of the pin 48, another return spring 68 in the form of a leaf spring urges the slide 54 radially inward fro the guide thimble 16 to cause retraction of the cutting wheel 60 within the perimeter of the forward portion 58 of the cutter body 44.

Therefore, through concurrent rotation of the cutter body 44 of the cutter 40 and advancement of the movable slide 54 and cutting wheel 60 therewith radially outward toward the guide thimble 16, the cutter 40 will precisely sever the guide thimble upper end portion 22 just below its region of attachment to the adapter plate 26 of the top nozzle 20. In such manner, removal of the top nozzle 20 is made possible and reconstitution of the fuel assembly 10 is facilitated by the cutter 40.

Figure 5:
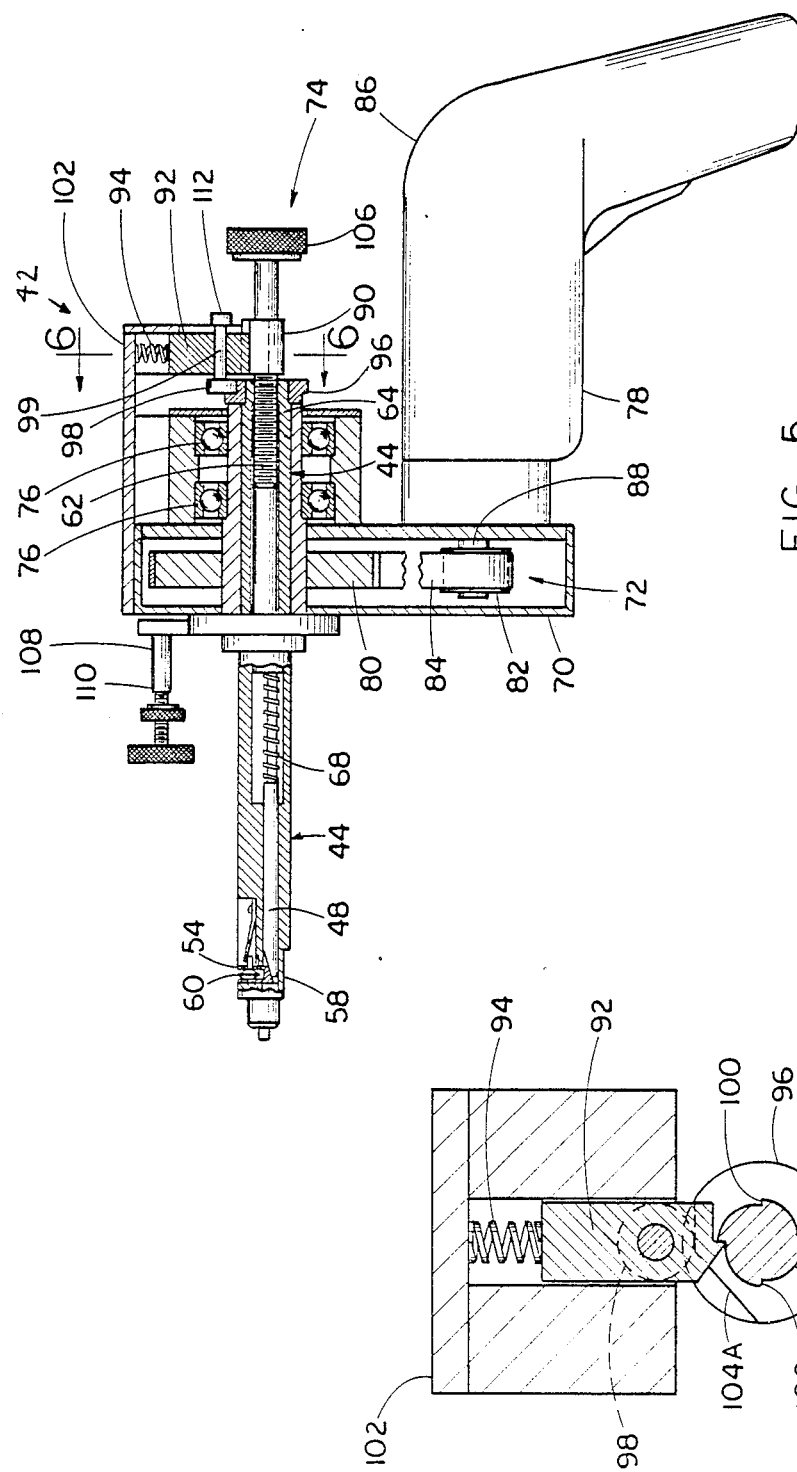
FIG. 5 is a side elevational view, partly sectioned, of the positive drive mechanism of the present invention which supports and operates the internal tube cutter.
Figure 6:
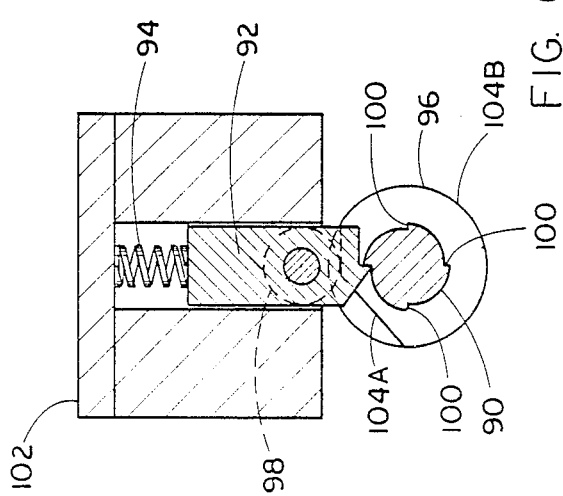
FIG. 6 is an enlarged sectional view taken along line 6—6 of FIG. 5.

Referring now to FIGS. 5 and 6, there is shown the positive drive mechanism 42 which is adapted to intermittently advance the cutting wheel 60 into the guide thimble upper end portion 22 at a rate that is proportional to the rotational speed of the cutter body 44 so as to cause a "parting action" on the guide thimble upper end portion 22 which severs it without producing chips and avoids work hardening of the guide thimble material.

In its basic components, the drive mechanism 42 includes a housing 70, a cutter body drive portion 72 and a cutter wheel feed portion 74. The housing 70 rotatably mounts the cutter body 44 at bearings 76, whereas the cutter body drive portion 72 is mounted to the housing 70. The cutter body drive portion 72 is drivingly interconnected to the cutter body 44 and operable for rotating or counterrotating the cutter body in respective counterclockwise or clockwise directions. The cutter wheel feed portion 74 is engaged with the elongated pin 48 of the cutter 40 at the rear portion 64 of the cutter body 44 and operable to intermittently move the pin 48 in a forward direction toward the slide 54 or permit movement of the pin 48 in a opposite rearward direction away from slide 54 during each rotation cycle of the cutter body 44 by the cutter body drive portion 72.

More particularly, the cutter body drive portion 72 includes power means 78, a driven member 80, a drive member 82 and an endless flexible member 84. The power means 78 is preferably in the form of a variable speed, reversible drive motor housed in a casing 86 (for example, a hand-held power drill) adapted to be gripped manually and being attached to the housing 70. The reversible motor has an output drive shaft 88 selectively rotatable in either clockwise and counterclockwise directions. The driven member 80 is a pulley drivingly coupled to the cutter body 44 by being secured thereabout. The drive member 82 also is a pulley drivingly coupled to the output shaft 88 of the power means motor 78 by being attached thereon. The endless flexible member 84 can be a belt which extends between and is drivingly entrained about the aligned driven and drive pulleys 80,82 for transmitting the clockwise or counterclockwise rotary motion of the output shaft 88 to the cutter body 44.

The cutter wheel feed portion 74, which is generally located rearwardly of the cutter body drive portion 72, includes the feed screw 62, a ratchet 90, a pawl 92, a biasing spring 94, a cam 96 and a cam follower 98. As mentioned previously, the feed screw 62 is rotatably and threadably mounted in the rear portion 64 of the cutter body 44 and engaged with the pin 48 of the cutter 40. The feed screw 62 is adapted to be maintained stationary by cooperation of the ratchet 90, pawl 92 and spring 94 as will be described shortly. While maintained stationary with respect to the cutter body 44 as the latter is rotated counterclockwise, the feed screw 62 (having fine "right handed" external threads) will thread into the cutter body 44 and cause movement of pin 48 in the forward direction toward the slide 54. As explained earlier, the slide 54, in turn, advances the cutting wheel 60 radially outward toward and into contact with the guide thimble upper end portion 22. On the other hand, by holding the feed screw 62 stationary with respect to the cutter body 44 as the latter is rotated clockwise, the feed screw 62 will unthread from the cutter body 44 and permit movement of the pin 48, via the assist of return spring 66, in the opposite rearward direction away from the slide 54. Consequently, as described above, the slide 54, in turn, retracts the cutting wheel 60, via the assist of return spring 68, radially inwardly away from and out of contact with the guide thimble upper end portion 22.

The ratchet 90 is attached to the feed screw 62 and is rotatable therewith. It has a plurality of peripherally-arranged spaced-apart teeth 100. The pawl 92 pivotally mounted to a rear bracket 102 on the drive mechanism housing 70 extends laterally adjacent to the ratchet 90 for movement into and out of engagement with the teeth 100 thereof. The pawl 92 when engaged with the ratchet teeth 100 is adapted to maintain the ratchet 90, and the feed screw 62 therewith, stationary relative to the cutter body 44, whereby the feed screw 62, as just explained, will thread into the cutter body 44 upon counterclockwise rotation thereof On the other hand, when the pawl 92 is disengaged from the ratchet teeth 100, the ratchet 90 and feed screw 62 are free to rotate with the cutter body 44, whereby the feed screw 62 will then neither thread into nor unthread from the cutter body. The biasing spring 94 is mounted between the rear bracket 102 and the pawl 92 so as to normally urge the pawl 92 into engagement with the ratchet teeth 100.

Cooperation between the cam 96 and cam follower 98 determines whether or not the pawl 92 engages the ratchet teeth 100. The cam 96 is located between the rear bearing 76 and the ratchet 90 and is attached to the rear portion 64 of the cutter body 44 for rotation therewith. The cam 96 has a profile or periphery 104 with first and second portions 104A,104B representing the lowest and highest portions thereof. The cam follower 98 is rotatably mounted to a shaft 99 attached to the pawl 92 and rides in engagement with the periphery 104 of the cam 96. Thus, as the cam 96 rotates with the cutter body 44 and the cam follower 98 rides on the first or lowest peripheral cam portion 104A, the pawl 92 is displaced toward the ratchet 90 allowing the biasing spring 94 to urge the pawl 92 into engagement with the ratchet teeth 100. On the other hand, as the cam follower 98 rides on the second or highest peripheral cam portion 104B, the pawl 92 is displaced away from the ratchet 92 against the bias of the spring 94 and disengaged from the ratchet teeth 100. In one design of the periphery 104 of the cam 96, there is one hundred thirty-five degrees of rotation between the lowest portion 104A and the highest portion 104B which ensures engagement of one of the ratchet teeth 100 by the pawl 92 for at least ninety degrees of each rotation cycle of the cutter body 44 and cam 96. This degree or interval of rotation causes the cutting wheel 60 to be advanced radially outward approximately 0.0027 inch during each rotation cycle of the cutter body 44. The outward motion rate of the cutting wheel 60 can be changed by changing the design of the periphery 104 of the cam 96.

Also, the feed screw 62 has an extension in the form of a knob 106 which can be used for holding the feed screw 62 stationary as the cutter body 44 is rotated clockwise to allow the pin 48 to move rearwardly. Also, the knob 106 can be manually rotated for rapidly threading or unthreading the feed screw 62 into or from the cutter body 44 while the latter is stationary. This would normally be used immediately prior to beginning the severing of the guide thimble 16 or after the severing is completed so that the cutting wheel 60 can be quickly retracted so that it will not become damaged during withdrawal of the cutter 40 from the guide thimble. Prior to turning the knob 106, the pawl 92 is lifted clear of the ratchet 90 by using a release pin 112 connected to and projecting rearwardly from the pawl 92.

In addition, an elongated arm 108 is provided on the housing 70 of the drive mechanism 42, projecting forwardly therefrom. The arm 108 is threadably adjustable for setting the depth to which the forward portion 58 of the cutter body 44 can extend into the guide thimble upper end portion 22. For instance, the depth is determined when the outer end 110 of the arm contacts the top surface of the top nozzle adapter plate 26.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In combination with an internal tube cutter including an elongated cutter body insertable into a tube to be severed, a cutting wheel, means supporting said cutting wheel on a forward portion of said cutter body and being movable radially of said cutter body for advancing and retracting said cutting wheel toward and away from the tube, and an elongated member mounted through said cutter body for movement longitudinally thereof in one direction to cause outward radial movement of said cutting wheel supporting means and advancement of said cutting wheel toward and into contact with the tube to cause severing of the same upon rotation of said cutter body and in an opposite direction to permit inward radial movement of said cutting wheel supporting means and retraction of said cutting wheel away from and out of contact with the tube, a positive drive mechanism comprising:

(a) a housing rotatably mounting said cutter body;
(b) a cutter body drive portion mounted to said housing and drivingly interconnected to said cutter body, said drive portion being operable for rotating or counterrotating cutter body; and
(c) a cutter wheel feed portion including
 (i) a feed member rotatably threadably mounted in a rear portion of said cutter body and engaged with said elongated member of said cutter, said feed member while being maintained stationary threading into said cutter body and causing movement of said elongated member in said one direction toward said cutting wheel supporting means as said cutter body is rotated in one direction, said feed member while being held stationary unthreading from said cutter body and permitting movement of said elongated member in said opposite direction away from said cutting wheel supporting means as said cutter body is counterrotated in an opposite direction,
 (ii) a ratchet attached to said feed member for rotatable movement therewith,
 (iii) a pawl pivotally mounted to said housing adjacent said ratchet for movement into and out of engagement therewith, said pawl when engaged with said ratchet maintaining said ratchet and feed member therewith stationary relative to said cutter body whereby said feed member threads into said cutter body upon rotation thereof, said pawl when disengaged from said ratchet permitting said ratchet and feed member to rotate with said cutter body,
 (iv) biasing means normally urging said pawl into engagement with said ratchet,
 (v) a cam attached to said rear portion of said cutter body for rotation therewith and having a periphery with first and second portions,
 (vi) a cam follower mounted to said pawl and riding in engagement with said periphery of said cam such that as said cam rotates with said cutter body and said cam follower rides on said first peripheral cam portion said pawl is displaced toward said ratchet allowing said biasing means to urge said pawl into engagement with said ratchet, whereas as said cam follower rides on said second peripheral cam portion said pawl is displaced away from said ratchet and disengaged from said ratchet, and
 (vii) means connected to said feed member for permitting holding the latter stationary to cause said unthreading thereof from said cutter body and permit said movement of said elongated member in said opposite direction away from said cutting wheel supporting means as said cutter body is counterrotated in said opposite direction.

2. The positive drive mechanism as recited in claim 1, wherein said cutter body drive portion includes:

power means mounted to said housing and having a rotatable output drive shaft;

a driven member drivingly coupled to said cutter body;

a drive member drivingly coupled to said output shaft of said power means and drivingly interconnected to said driven member for transmitting the rotary motion of said output shaft to said cutter body.

3. The positive drive mechanism as recited in claim 2, wherein said cutter body drive portion further includes an endless flexible member extending between and drivingly interconnecting said drive and driven members for transmitting the rotary motion of said output shaft to said cutter body.

4. The positive drive mechanism as recited in claim 1, wherein said means for permitting holding said feed member stationary is an extension on said feed member being manually rotatable for threading or unthreading said feed member into or from said cutter body while the latter is stationary.

5. The positive drive mechanism as recited in claim 4, wherein said extension is in the form of a knob.

6. In combination with an internal tube cutter including an elongated cutter body insertable into a tube to be severed, a cutting wheel, means supporting said cutting wheel on a forward portion of said cutter body and being movable radially of said cutter body for advancing and retracting said cutting wheel toward and away from the tube, and an elongated member mounted through said cutter body for movement longitudinally thereof in one direction to cause outward radial movement of said cutting wheel supporting means and advancement of said cutting wheel toward and into contact with the tube to cause severing of the same upon rotation of said cutter body and in an opposite direction to permit inward radial movement of said cutting wheel supporting means and retraction of said cutting wheel away from and out of contact with the tube, a positive drive mechanism comprising:

(a) a housing rotatably mounting said cutter body;
(b) a cutter body drive portion including
  (i) power means mounted to said housing and having a rotatable output drive shaft,
  (ii) a driven member drivingly coupled to said cutter body, and
  (iii) a drive member drivingly coupled to said output shaft of said power means and drivingly interconnected to said driven member for transmitting the rotary motion of said output shaft to said cutter body; and
(c) a cutter wheel feed portion including
  (i) a feed member rotatably threadably mounted in a rear portion of said cutter body and engaged with said elongated member of said cutter, said feed member while being maintained stationary threading into said cutter body and causing movement of said elongated member in said one direction toward said cutting wheel supporting means as said cutter body is rotated in one direction, said feed member while being held stationary unthreading from said cutter body and permitting movement of said elongated member in said opposite direction away from said cutting wheel supporting means as said cutter body is counterrotated in an opposite direction,
  (ii) a ratchet attached to said feed member for rotatable movement therewith and having a plurality of peripherally-arranged spaced-apart teeth,
  (iii) a pawl pivotally mounted to said housing adjacent said ratchet for movement into and out of engagement with said teeth thereof, said pawl when engaged with said ratchet teeth maintaining said ratchet and feed member therewith stationary relative to said cutter body whereby said feed member threads into said cutter body upon rotation thereof, said pawl when disengaged from said ratchet teeth permitting said ratchet and feed member to rotate with said cutter body,
  (iv) biasing means normally urging said pawl into engagement with said ratchet teeth,
  (v) a cam attached to said rear portion of said cutter body for rotation therewith and having a periphery with first and second portions,
  (vi) a cam follower mounted to said pawl and riding in engagement with said periphery of said cam such that as said cam rotates with said cutter body and said cam follower rides on said first peripheral cam portion said pawl is displaced toward said ratchet allowing said biasing means to urge said pawl into engagement with said ratchet teeth, whereas as said cam follower rides on said second peripheral cam portion said pawl is displaced away from said ratchet and disengaged from said ratchet teeth, and
  (vii) means connected to said feed member for permitting holding the latter stationary to cause said unthreading thereof from said cutter body and permit said movement of said elongated member in said opposite direction away from said cutting wheel supporting means as said cutter body is counterrotated in said opposite direction.

7. The positive drive mechanism as recited in claim 6, wherein said means for permitting holding said feed member stationary is an extension on said feed member being manually rotatable for threading or unthreading said feed member into or from said cutter body while the latter is stationary.

8. The positive drive mechanism as recited in claim 7, wherein said extension is in the form of a knob.

9. The positive drive mechanism as recited in claim 6, wherein said cutter body drive portion further includes an endless flexible member extending between and drivingly interconnecting said drive and driven members for transmitting the rotary motion of said output shaft to said cutter body.

10. The positive drive mechanism as recited in claim 6, further comprising:

an arm mounted to and projecting from said housing and being adjustable for setting the depth to which said forward portion of said cutter body extends into said tube to be severed.

11. A positive drive mechanism for use with an internal tube cutter, said positive drive mechanism comprising:

(a) a housing for rotatably mounting a cutter body of the internal tube cutter;
(b) a drive portion mounted to said housing for driving interconnection to the cutter body, said drive portion being operable for rotating or counterrotating said cutter body when interconnected thereto; and
(c) a feed portion engagable with an elongated member of the cutter at a rear portion of the cutter body and being operable to intermittently move the elongated member in one direction toward a cutting wheel supporting member of the cutter or permit movement of the elongated member in an opposite direction away from the cutting wheel supporting member during each rotation cycle of the cutter body, said feed portion including (i) a feed member rotatably threadably mounted in a rear portion of said cutter body and engaged with said elongated member of said cutter, said feed member while being maintained stationary threading into said cutter body and causing movement of said elongated member in said one direction toward said cutting wheel supporting means as said cutter body is rotated in one direction, said feed member while being maintained stationary unthreading from said cutter body and permitting movement of said elongated member in said opposite direction away from said cutting wheel supporting means as said cutter body is counterrotated in an opposite direction, (ii) a ratchet attached to said feed member for rotatable movement therewith, (iii) a pawl pivotally mounted to said housing adjacent said ratchet for movement into and out of engagement therewith, said pawl when engaged with said ratchet maintaining said ratchet and feed member therewith stationary relative to said cutter body whereby said feed member threads into said cutter body upon rotation thereof, said pawl when disengaged from said ratchet permitting said ratchet and feed member to rotate with said cutter body, (iv) biasing means normally urging said pawl into engagement with said ratchet, (v) a cam attached to said rear portion of said cutter body for rotation therewith and having a periphery with first and second portions, (vi) a cam follower mounted to said pawl and riding in engagement with said periphery of said cam such that as said cam rotates with said cutter body and said cam follower rides on said first peripheral cam portion said pawl is displaced toward said ratchet allowing said biasing means to urge said pawl into engagement with said ratchet, whereas as said cam follower rides on said second peripheral cam portion said pawl is displaced away from said ratchet and disengaged from said ratchet teeth, and (vii) means connected to said feed member for permitting holding the latter stationary to cause said unthreading thereof from said cutter body and permit said movement of said elongated member in said opposite direction away from said cutting wheel supporting means as said cutter body is counterrotated in said opposite direction.

12. The positive drive mechanism as recited in claim 11, wherein said drive portion includes:
power means mounted to said housing and having a rotatable output drive shaft;
a driven member drivingly couplible to the cutter body; and
a drive member drivingly coupled to said output shaft of said power means and drivingly interconnected to said driven member for transmitting the rotary motion of said output shaft to the cutter body.

13. The positive drive mechanism as recited in claim 12, wherein said drive portion further includes an endless flexible member extending between and drivingly interconnecting said drive and driven members for transmitting the rotary motion of said output shaft to the cutter body.

14. The positive drive mechanism as recited in claim 11, wherein said means for permitting holding said feed member stationary is an extension on said feed member being manually rotatable for threading and unthreading said feed member into and from said cutter body while the latter is stationary.

15. The positive drive mechanism as recited in claim 14, wherein said extension is in the form of a knob.

* * * * *